No. 866,710. PATENTED SEPT. 24, 1907.
W. P. BOLLER.
ATTACHMENT FOR POTATO PLANTERS.
APPLICATION FILED SEPT. 11, 1906.
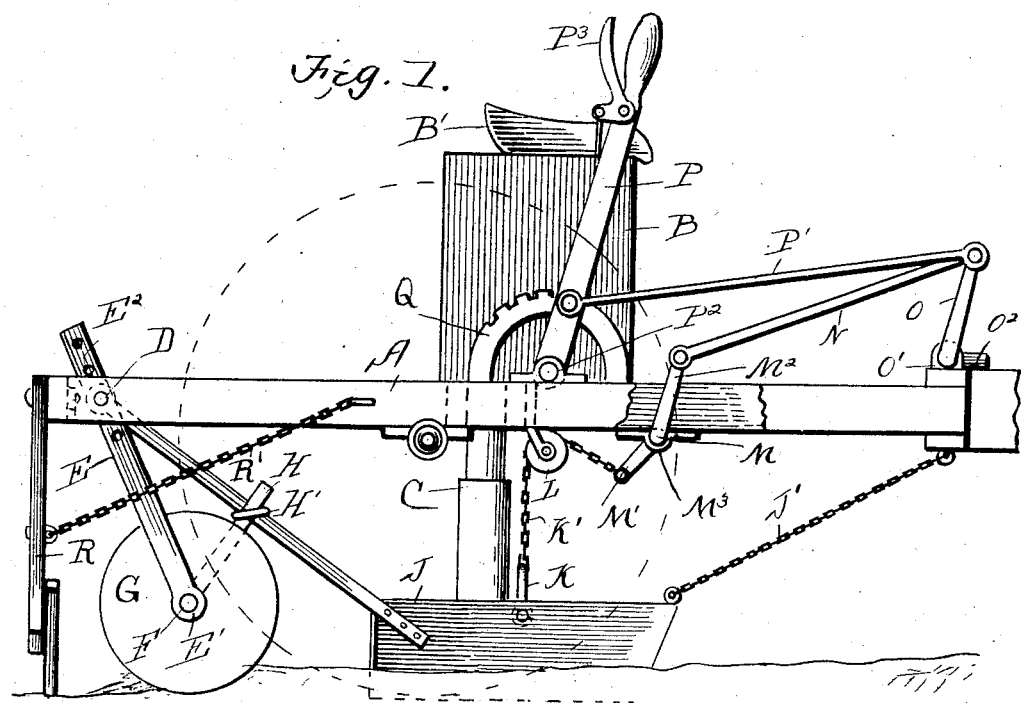
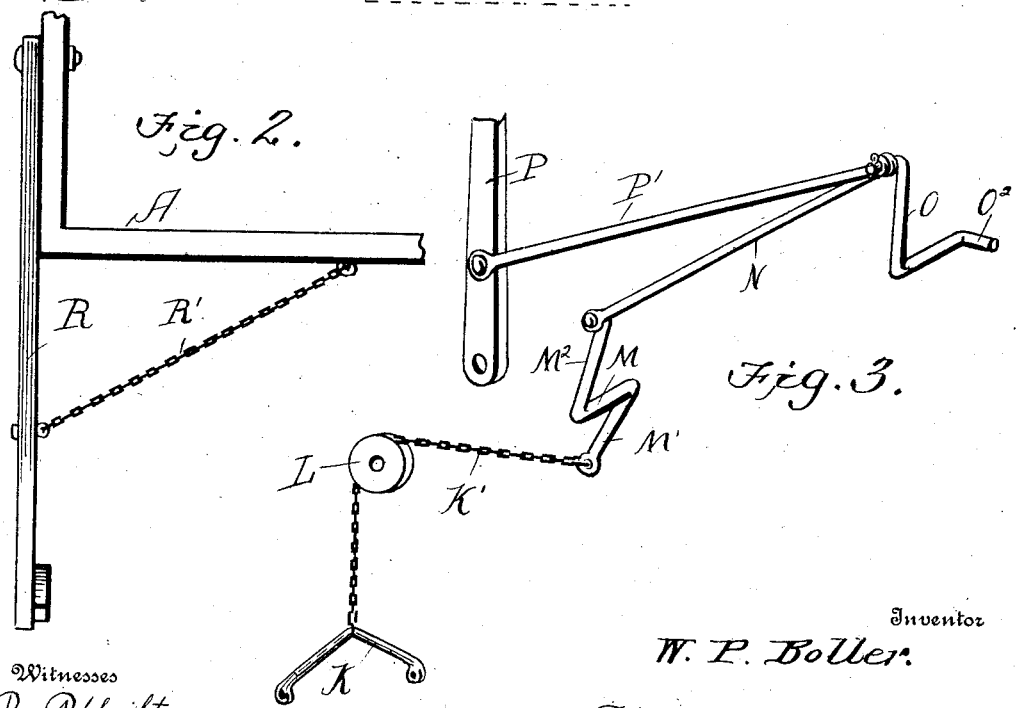
Inventor
W. P. Boller.

UNITED STATES PATENT OFFICE.

WILLIAM P. BOLLER, OF BYRON, WISCONSIN.

ATTACHMENT FOR POTATO-PLANTERS.

No. 866,710.

Specification of Letters Patent.

Patented Sept. 24, 1907.

Application filed September 11, 1906. Serial No. 334,189.

*To all whom it may concern:*

Be it known that I, WILLIAM P. BOLLER, a citizen of the United States, residing at Byron, in the county of Fond du Lac and State of Wisconsin, have invented a new and useful Improvement in Attachments for Potato-Planters, of which the following is a specification.

This invention relates to attachments for potato planters and more particularly to means for raising and lowering the plow and disk, the object being to provide a potato planter with very simple and efficient means for adjusting the plow and disk and for holding the plow and disk rigid in an adjusted position.

With this object in view, the invention consists in the novel features of construction, combination and arrangement of parts, hereinafter fully described and pointed out in the claims.

In the drawings forming a part of this specification:—Figure 1 is a side elevational view of a planter provided with my improved plow and disk adjusting means. Fig. 2 is a detail plan view of the marker and a portion of the frame. Fig. 3 is a perspective view of the operating means detached.

Referring to the drawings A indicates a frame adapted to be mounted in wheels not shown, provided with the ordinary seed box B having a seat B' arranged thereon and provided with an adjustable spout C, extending therefrom. A shaft D is secured between the side bars of the frame, adjacent its rear end on which is mounted an arm E adjacent each end provided with an enlarged apertured end E', in which a shaft F is mounted provided with disks G. The upper end of the arms E are provided with a series of openings E², so that they can be adjusted on the shaft when desired.

Arms H are mounted on the shaft provided with links H', through which the arms I mounted on the shaft F, extend and are secured thereto. The end of the arms H are connected to the side of a V-shaped plow or furrow opener J, which surrounds the spout and is connected at its forward end to the frame by a chain J'. A bail K is secured to the side of the plow J to which a chain K' is connected which passes over a pulley L, secured to one of the bars of the frame, and is connected to the arm M' of a double crank M, which is mounted in a bearing M³, secured to one of the bars of the frame. A link N is connected to the arm M², of the crank M having its other end connected to a crank arm O, mounted in a bearing O', on the frame which is provided with a foot portion O², adapted to engage the frame and limit the forward movement of the same. A link P' is connected to the crank arm O having its other end connected to a lever P, which is mounted in a bearing P² on one of the bars of the frame to one side of the box and is provided with a hand-lever P³, adapted to engage a segmental rack Q, and securely lock the same in any position desired.

A marker R is pivoted to the rear cross-bar of the frame carrying a chain R' adapted to be connected to an eye secured to the side bars of the frame. It will be seen that the marker can be adjusted to either side desired.

From the foregoing description it will be seen that I have provided very novel means for adjusting the plow and disk at the same time, so that the plow will be held rigid thereby overcoming the difficulties now existing with planters now in use.

Having thus fully described my invention, what I claim as new and desire to secure by Letters Patent is:—

1. In a planter, the combination with a frame, of arms pivoted to said frame carrying disks, and a plow, a double crank mounted on said frame connected to said plow, a crank mounted on said frame connected to said double crank, and a lever connected to said crank, for the purpose described.

2. In a planter, the combination with a frame, of arms pivoted to said frame carrying disks and a plow, a double crank mounted on said frame connected to said plow by a chain passing over a pulley carried by the frame, a crank mounted on said frame connected to the double crank, and provided with a foot adapted to engage the frame, and a lever connected to said crank for the purpose described.

3. In a planter, the combination with a frame, of arms pivoted to said frame carrying disks and a plow a double crank mounted on said frame, a pulley mounted under said frame, a chain connected to said plow passing over said pulley connected to one of the arms of the double-crank, a crank mounted on said frame connected to the other arm of said crank by a link, a link carried by said crank and a lever connected to said link mounted on said frame.

WILLIAM P. BOLLER.

Witnesses:
A. W. SAMPSON,
AMOS SAMPSON.